(12) United States Patent
Tate

(10) Patent No.: US 11,500,352 B2
(45) Date of Patent: Nov. 15, 2022

(54) SYSTEM AND METHOD FOR MONITORING A PRODUCTION PROCESS

(71) Applicant: DH Technologies Development Pte. Ltd., Singapore (SG)

(72) Inventor: Stephen A. Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 249 days.

(21) Appl. No.: 16/865,171

(22) Filed: May 1, 2020

(65) Prior Publication Data

US 2020/0363783 A1 Nov. 19, 2020

Related U.S. Application Data

(60) Provisional application No. 62/841,620, filed on May 1, 2019.

(51) Int. Cl.
| | |
|---|---|
| *G06F 9/30* | (2018.01) |
| *G06F 9/44* | (2018.01) |
| *G06F 9/445* | (2018.01) |
| *G06F 9/455* | (2018.01) |
| *G05B 19/406* | (2006.01) |
| *G06N 20/00* | (2019.01) |

(52) U.S. Cl.
CPC .......... *G05B 19/406* (2013.01); *G06N 20/00* (2019.01); *G05B 2219/32368* (2013.01)

(58) Field of Classification Search
CPC G01N 33/6848; H01J 49/004; H01J 49/0036; H01J 49/0031; Y10T 436/24; C12Q 1/6827; C12Q 1/6811; C12Q 1/6806; C12Q 2535/122; C12Q 2537/165; A61K 2300/00; G05B 19/406; G05B 2219/32368; G06N 20/00
See application file for complete search history.

(56) References Cited

U.S. PATENT DOCUMENTS

| | | | |
|---|---|---|---|
| 2010/0288917 A1* | 11/2010 | Satulovsky | H01J 49/0031 250/281 |
| 2012/0129201 A1* | 5/2012 | Suckau | G01N 33/6848 435/68.1 |
| 2018/0284075 A1* | 10/2018 | Ojima | G01N 1/405 |
| 2018/0371519 A1* | 12/2018 | Lee | G16C 20/20 |
| 2019/0096650 A1* | 3/2019 | Deininger | G01N 33/6851 |
| 2020/0132604 A1* | 4/2020 | Clancy | G01N 21/6445 |

OTHER PUBLICATIONS

Thomas et al., Enhancing classification of mass spectrometry imaging data with deep neural networks, 8 pages (Year: 2017).*

* cited by examiner

*Primary Examiner* — Thuy Dao

(57) ABSTRACT

A system and method is provided for monitoring a production process. In some aspects, the system may include an aseptic sampling device in fluidic connection with a process fluid, the aseptic sampling device operative to collect one or more samples from the process stream. A pretreatment device may be included to receive and pretreat the one or more samples. An analyzer is operative to analyze the pretreated samples and to produce one or more mass spectrometry (MS) spectra. A classifier receives and classifies the one or more MS spectra to provide a measure of product quality of the process fluid corresponding to the sampling location and time of sampling.

13 Claims, 6 Drawing Sheets

SYSTEM AND METHOD FOR MONITORING A PRODUCTION PROCESS

RELATED APPLICATION

This application claims priority to U.S. provisional application No. 62/841,620 filed on May 1, 2019 the content of which is incorporated herein by reference in its entirety.

FIELD

The invention relates generally to sample analysis and more particularly to those involving measurements to confirm quality of process products such as bioprocess products.

BACKGROUND

Process engineering relates to the manufacture of process products which can include a wide range of outputs that result from chemical or biological activity. Process engineering commonly involves the combination of one or more input feedstocks in a reaction chamber under controlled environmental conditions for sufficient process time to produce desired one or more process products. Process engineering commonly relies on the use of sensors to provide feedback to allow for the control of process variables such as feedstock flow rate, temperature, mixing, time, etc.

Bioprocess engineering relates to the manufacture of bioprocess products, such as animal feed, food, beer, wine, pharmaceuticals, chemicals, polymers, etc. that are produced by the biological actions of a biological feedstock. The rise of biological-derived pharmaceutical agents in particular, has resulted in the development of complex bioprocess production systems which require multiple production steps.

In general, current bioprocess production systems start with some form of bioreactor which contains the biological feedstock to be maintained at optimum reaction conditions to produce a desired bioprocess product. As an example, the biological feedstock may be a host cell line that is genetically engineered to produce the product, such as a pharmaceutical agent. The growth conditions for the biological feedstock in the bioreactor are carefully monitored through the use of online sensors which monitor the bioreactor conditions, the growth media, and any byproducts. These sensors provide the monitoring results to a control unit which is operative to adjust the bioreactor conditions, growth media and/or other nutrient balance to maintain optimum growth conditions to ensure that the growth is not inhibited and in some cases to avoid unwanted byproducts.

Once the culture is growth to a specific confluence they are harvested and purification of the product pharmaceutical agent, or product pharmaceutical precursor, is undertaken. In general, the purification process starts with the removal of the cell material through centrifugation or other separation techniques and the cell-free liquor is prepared for loading onto a chromatography column which will start the purification of the material. It may be that the active material is passed through a number of different purification systems, and or additional processing steps, until the product reaches a final quality which is suitable to use in human trials or as a final product drug. Each step of purification is controlled through the use of loading and eluting buffers which have very specific salt and pH levels. The eluting buffers are generally developed in a process of different experiments to determine the optimal conditions for each drug component which are then "locked-in" as part of the manufacturing process. Such a system is called a Batch Fill process where the cell culture is grown in the bioreactor as a batch to a specific confluence at which point the entire batch is harvested. In some cases a portion of the produced cell culture from the batch may be reserved to be used as a seed for a subsequent batch.

A new continuous bioprocess system is starting to gain traction where the cell-free media product is "sipped" from the bulk cell culture and the sipped cell-free media is then processed in a continuous purification process as it is separated from the bulk cell culture. There are significant advantages for this form of system in that the product is produced in a faster manner and each step in the system can be used to provide incremental feedback of product quality relating to specific samples, rather than a common quality for a whole batch. In some implementations the process may be operated in a continuous manner with input feed stock and growing conditions maintained for continuous production of product over an extended period of time. The continuous bioprocess system does introduce the risk, however, that any failure during operation of the system can result in a variation in the product quality. As a result, the final product may require incremental product quality testing, rather than being able to rely upon a single product quality test for an entire batch of product.

In such continuous systems monitoring the product at all stages of the system is important as there is a risk for quality degradation which creeps slowly through the complete system.

Although there are some techniques available for online/inline or at line monitoring of the product which are suitable for such a system, many do not provide enough information or have sufficient resolution to be able to provide a measure of the quality of the product. Such systems could theoretically provide a direct feedback of the product quality with which real time decision of the purification system could be made. However, such systems are difficult to control and very difficult to create in a robust and repeatable manner which limits their implementation. Moreover, results produced by such systems typically require specialized analysis and monitoring by experienced personnel, and often are unable to provide automated product quality estimation results on an actionable real-time basis.

Conventional mass spectrometry involves generating mass spectra and then evaluating the mass spectra to identify or quantitate all of the compounds represented in the spectra. Unfortunately, such detailed analysis is time consuming and does not produce actionable information for operating a process.

There is a need for systems and methods which allow for the analysis of biological and other samples while reducing the initial sample preparation and purification requirements before introduction into an analytical device.

SUMMARY

In some embodiments, a mass spectrometer-based system may be used for monitoring production products for either batch fill or continuous bioprocessing. In some aspects, the bioprocess may be sampled in real-time, or near real-time, with the system providing output indications of product quality in real-time, or near real-time, sufficient to allow corrective action to be taken. In some aspects, the bioprocess may be sampled over a sampling period and the samples may be evaluated by the system in an off-line mode to confirm all steps of the process met an expected product quality or to identify specific sampling periods where the process deviated from an expected product quality.

In some implementations, an acoustic droplet ejector (ADE) may be used in combination with an open port interface (OPI) to rapidly process a number of collected samples for an expected product quality. In some implementations, an OPI may be used to collect sample diverted from a bioprocess and dilute and transfer the diluted sample to a mass spectrometer for analysis.

In the implementations the samples may, or may not, be processed after collection and before introduction into the OPI.

Conveniently, by evaluating samples based on a model, the model representative of an expected mass spectrometer output, process products may be qualitatively confirmed without requiring detailed mass spectra analysis.

In some embodiments, a system and method is provided for monitoring a production process. In some aspects, the system may include an aseptic sampling device in fluidic connection with a process fluid, the aseptic sampling device operative to collect one or more samples from the process stream. A pretreatment device may be included to receive and pretreat the one or more samples. An analyzer is operative to analyze the pretreated samples and to produce one or more mass spectrometry (MS) spectra. A classifier receives and classifies the one or more MS spectra to provide a measure of product quality of the process fluid corresponding to the sampling location and time of sampling.

Using a classifier may simplify the evaluation as MS spectra are not evaluated to identify compounds or specific compound quantities. Instead, expected MS spectra classification patterns may be detected to generate a pass/fail product quality metric. Depending upon an outcome subsequent conventional LC-MS or LC-MS/MS analysis may be conducted to verify the products present at that sampling period.

In some aspects, an OPI provides pretreatment of the samples. The pretreatment may include dilution and/or separation of products included in the samples.

In some aspects, one or more samples are collected from a process. The samples may each be optionally pretreated before analysis by a mass spectrometer. Mass spectra generated by the mass spectrometer from the one or more samples may be compared to a model representative of expected products for each sample. A product quality metric may be generated based on the comparison between the model and the generated mass spectra. In some aspects, the expected products may comprise reaction products indicative of the process. In some aspects, the expected products may comprise deviant products indicative of a deviation from the expected process.

FIGURES

DETAILED DESCRIPTION

A system and method is provided for monitoring a production process. In some aspects, the system may include an aseptic sampling device in fluidic connection with a process fluid, the aseptic sampling device operative to collect one or more samples from the process stream. A pretreatment device may be included to receive and pretreat the one or more samples. An analyzer is operative to analyze the pretreated samples and to produce one or more mass spectrometry (MS) spectra. A classifier receives and classifies the one or more MS spectra to provide a measure of product quality of the process fluid corresponding to the sampling location and time of sampling.

In some aspects, the sampling device may be in fluidic connection with a process stream containing process fluid to be sampled. In some aspects, the sampling device may be in fluidic connection with a process reactor containing process fluid to be sampled.

In some aspects, sample may be collected at discrete sampling periods and a batch of collected samples analyzed to produce a series of results, each result corresponding to one of the sampling periods.

In some aspects, the analyzer may comprise a mass spectrometer. In some aspects, the mass spectrometer may be operative to use at least one fragmentation method for the analysis of molecules. The mass spectrometer may be operative to provide multiple mass spectra including parent ions and daughter ions fragmented from the parent ion for a sample being analyzed. By sampling a process at multiple sampling periods throughout the process, separate classifier models may be generated for each sampling period. The separate models each representative expected products produced by the process at each of the corresponding sampling periods.

Conveniently, the state of each sampling period for a process may be represented by the corresponding model and subsequent processes evaluated by comparing mass spectrometer analysis in the form of mass spectra against the corresponding model to produce a product quality metric. In this fashion, an indicia of product quality may be generated without evaluating mass spectra to identify specific products or their quantity at each sampling period. In cases where parent and daughter ions are produced and evaluated, the classifier may be used to simplify their evaluation and to account for changes in expected product composition as the process evolves.

A method for the development of classifier model which includes the alteration of the molecule structure and analysis through a device which will provide sufficient fragment ion information, a data preprocessor which will clean and reduce the data, a classifier learning model which will determine the critical features and build a predictive model for the data The model may include separate classifiers for mass spectra representative of parent ions and daughter ions fragmented from the parent ions at each sampling period.

Figure 1A:
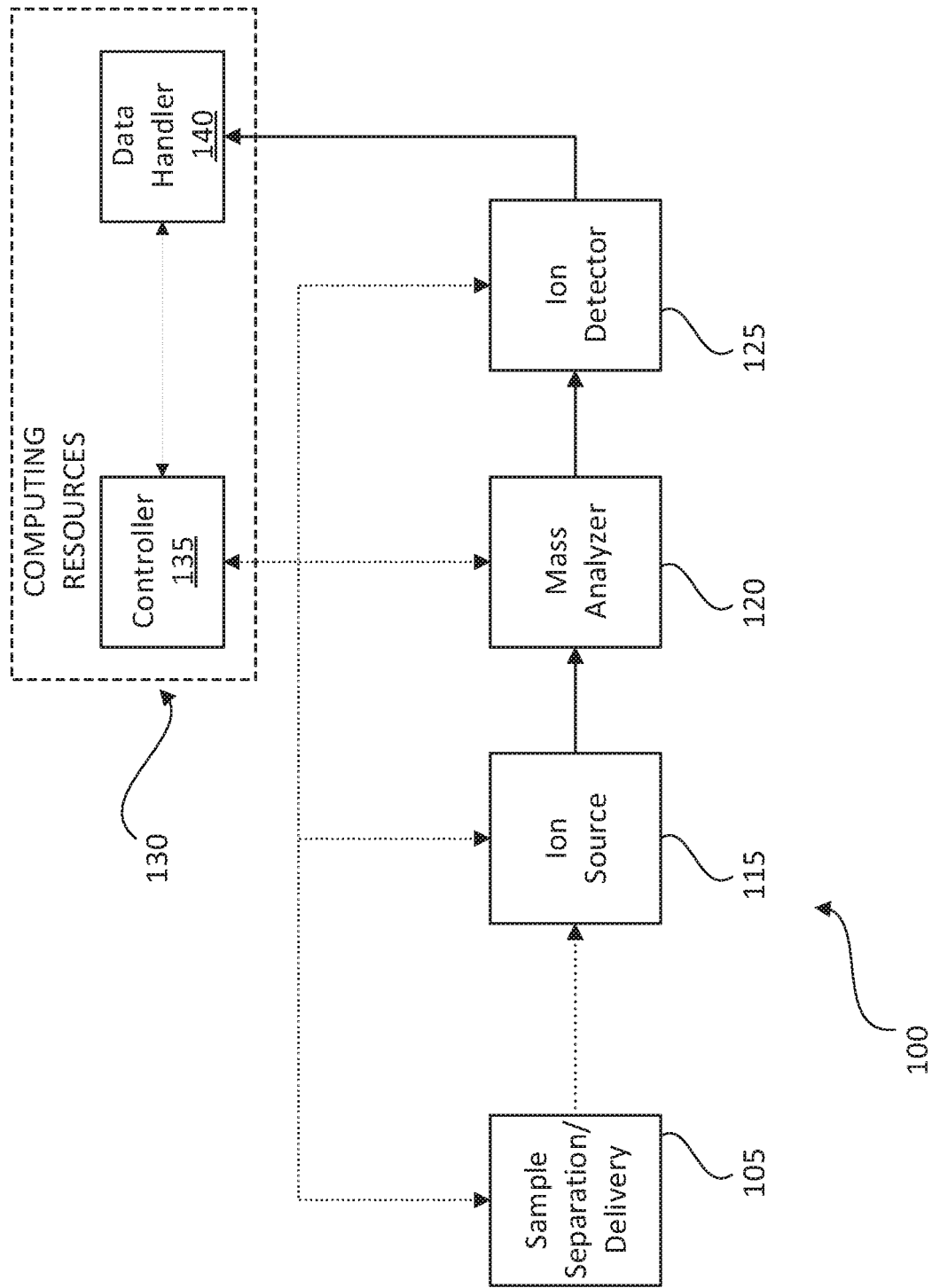
FIG. 1A is a simplified schematic of an embodiment of a system.

FIG. 1A presents, an exemplary mass analysis instrument 100 according to various embodiments of the present teachings. The mass analysis instrument 100 is an electro-mechanical instrument for separating and detecting ions of interest from a given sample. The mass analysis instrument 100 includes computing resources 130 to carry out both control of the system components and to receive and manage the data generated by the mass analysis instrument 100. In the embodiment of FIG. 1A the computing resources 130 are illustrated as having separate modules: a controller 135 for directing and controlling the system components and a data handler 140 for receiving and assembling a data report of the detected ions of interest. Depending upon requirements the computing resources 130 may comprise more or less modules than those depicted, may be centralized, or may be distributed across the system components depending upon requirements. Typically, the detected ion signal generated by the ion detector 125 is formatted in the form of one or more mass spectra based on control information as well as other process information of the various system components. Subsequent data analysis using a data analyzer (not illustrated in FIG. 1A) may subsequently be performed on the data report (e.g. on the mass spectra) in order to interpret the results of the mass analysis performed by the mass analysis instrument 100.

In some embodiments, mass analysis instrument 100 may include some or all of the components as illustrated in FIG. 1A. For the purposes of the present application, mass analysis instrument 100 can be considered to include all of the illustrated components, though the computing resources 130 may not have direct control over or provide data handling to, the sample separation/delivery component 105.

In some embodiments, the sample separation/delivery component 105 may comprise an open port interface (OPI) for capturing, diluting, and transporting diluted sample to the ion source 115 without additional pre-treatment. The OPI may be situated to receive diverted sample from a process flow, or may be arranged to receive metered sample from a sample delivery device. In some aspects, the sample separation/delivery component 105 may comprise a combination of an OPI with a sample delivery device in the form of an acoustic droplet ejection component for ejecting droplets of sample into the OPI.

Conveniently, in some aspects sample may be delivered directly to an OPI from a process stream, or process reactor, without additional pretreatment. In these aspects, the delivered sample may be mixed and diluted in the OPI before delivery to the ion source 115 as diluted sample. The sample may be delivered, for instance, as drops from an acoustic droplet component or as drops diverted from the bulk process, for instance through a diversion line.

In the context of this present application, a separation/delivery system 105, comprises a delivery system capable of delivering measurable amounts of sample, typically a combination of analyte and accompanying solvent sampling fluid, to an ion source 115 disposed downstream of the separation system 105 for ionizing the delivered sample. A mass analyzer 120 receives the generated ions from the ion source 115 for mass analysis. The mass analyzer 120 is operative to selectively separate ions of interest from the generated ions received from the ion source 115 and to deliver the ions of interest to an ion detector 125 that generates a mass spectrometer signal indicative of detected ions to the data handler 140. It will also be appreciated that the ion source 115 can have a variety of configurations as is known in the art.

For the purposes of this application, components of the mass analysis instrument 100 may considered to operate as a single system. Conventionally, the combination of the mass analyzer 120 and the ion detector 125 along with relevant components of the controller 135 and the data hander 140 are typically referred to as a mass spectrometer and the sample separation/delivery device may be considered as a separate component. It will be appreciated, however, that while some of the components may be considered "separate", such as the separation system 105 all the components of a mass analysis instrument 100 operate in coordination in order to analyze a given sample.

Figure 1B:
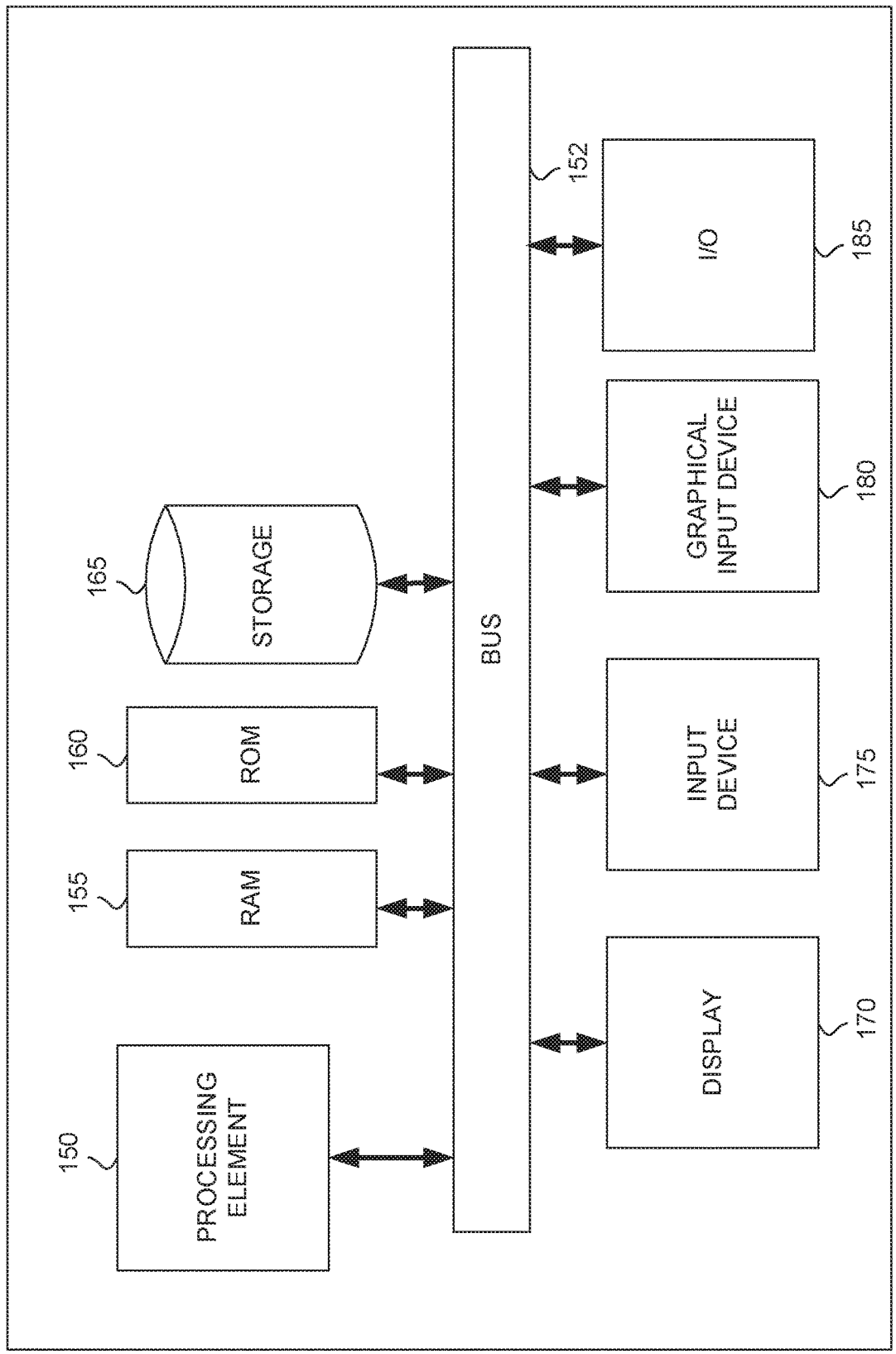
FIG. 1B is a simplified schematic of computing resources for a controller, in some embodiments.

FIG. 1B is a block diagram that illustrates exemplary computing resources 130 for a controller, upon which embodiments of the present teachings may be implemented. The computing resources 130 may comprise a single computing device, or may comprise a plurality of distributed computing devices in operative communication with components of a mass analysis instrument 100. In this example, computing resources 130 includes a bus 152 or other communication mechanism for communicating information, and at least one processing element 150 coupled with bus 152 for processing information. As will be appreciated, the at least one processing element 150 may comprise a plurality of processing elements or cores, which may be packaged as a single processor or in a distributed arrangement. Furthermore, in some embodiments a plurality of virtual processing elements 150 may be provided to provide the control or management operations for the mass analysis instrument 100.

Computing resources 130 also includes a volatile memory 150, which can be a random access memory (RAM) as illustrated or other dynamic memory component, coupled to bus 152 for use by the at least one processing element 150. Computing resources 130 may further include a static, non-volatile memory 160, such as illustrated read only memory (ROM) or other static memory component, coupled to bus 152 for storing information and instructions for use by the at least one processing element 150. A storage component 165, such as a storage disk or storage memory, is provided and, is illustrated as being coupled to bus 152 for storing information and instructions for use by the at least one processing element 150. As will be appreciated, in some embodiments the storage component 165 may comprise a distributed storage component, such as a networked disk or other storage resource available to the computing resources 130.

Optionally, computing resources 130 may be coupled via bus 152 to a display 170 for displaying information to a computer user. An optional user input device 175, such as a keyboard, may be coupled to bus 152 for communicating information and command selections to the at least one processing element 150. An optional graphical input device 180, such as a mouse, a trackball or cursor direction keys for communicating graphical user interface information and command selections to the at least one processing element 150. As illustrated, the computing resources 130 may further include an input/output (I/O) component 185, such as a serial connection, digital connection, network connection, or other input/output component for allowing intercommunication with other computing components and the various components of the mass analysis instrument 100.

In various embodiments, computing resources 130 can be connected to one or more other computer systems a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example. Various operations of the mass analysis instrument 100 may be supported by operation of the distributed computing systems.

Computing resources 130 may be operative to control operation of the components of the mass analysis instrument 100 though controller 135 and to handle the data generated by the components of the mass analysis instrument 100 through the data handler 140. In some embodiments, analysis results are provided by computing resources 130 in response to the at least one processing element 150 executing instructions contained in memory 160 or 165 and performing operations on data received from the mass analysis instrument 100. Execution of the instructions contained in memory 155, 160, 165 by the at least one processing element 150 render the mass analysis instrument 100 operative to perform methods described herein. Alternatively, hard-wired circuitry may be used in place of or in combination with software instructions to implement the present teachings. Thus, implementations of the present teachings are not limited to any specific combination of hardware circuitry and software.

In accordance with various embodiments, instructions configured to be executed by a processing element 150 to perform a method, or to render the mass analysis instrument 100 operative to carry out the method, are stored on a non-transitory computer-readable medium accessible to the processing element 150.

Figure 2A:
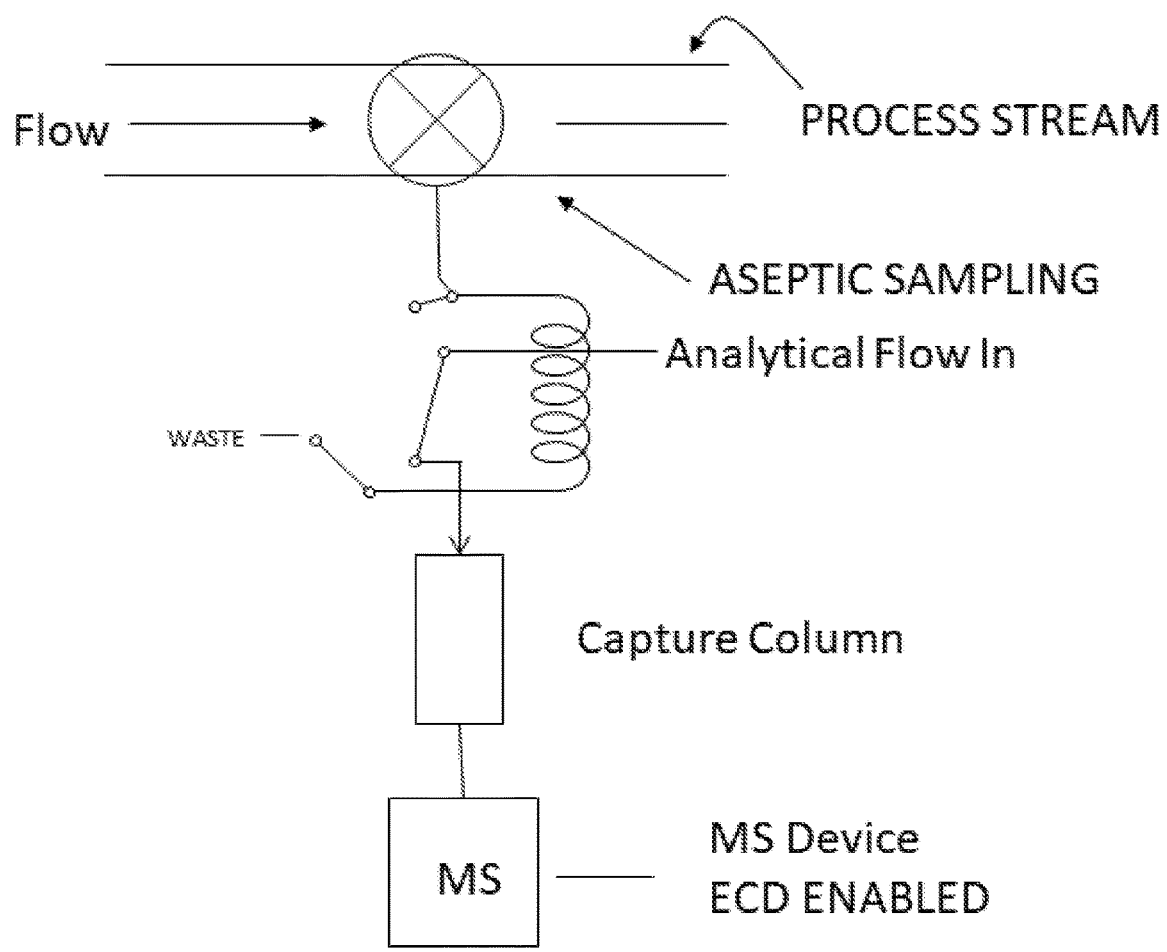
FIG. 2A is a simplified schematic of an embodiment of a process flow sampler.
Figure 2B:
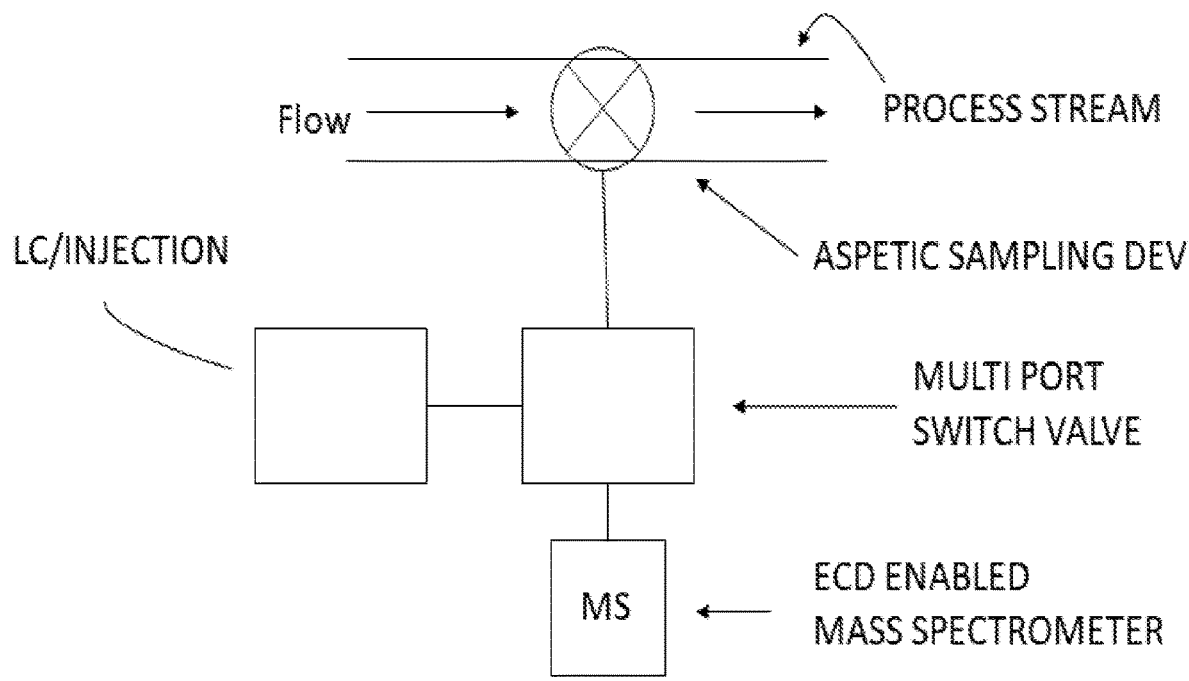
FIG. 2B is a simplified schematic of an embodiment of a process flow sampler.

Within the attempt to produce methods to provide better quality measure of product in purification systems there has been a lot of work investigating methods for sampling of product from process streams where the sample is aseptically taken and passed to an analytical device. FIG. 2A and FIG. 2B show 2 potential implementations which involve an aseptic sampling device which provides sample either directly to a mass spectrometer (FIG. 2A), or provides sample to a capture column which could either capture a portion of the sample (such as an active drug within the sample) or may capture the complete sample. The column may provide a complete analytical output of the analyzed sample or may provide an eluting sample for subsequent analysis by an analyzer, such as a mass analyzer.

In embodiments where the active drug is captured by the column, the captured drug may be analyzed directly or may be pretreated by the column through previously described methods for proteolytically fragmenting the drug and monitoring the peptides or fragments produced. The resulting data could then be processed through standard methods and result in a quality metric for the product. However, such methods require significant manual input for the analysis and limit the throughput available.

In embodiments a system is provided for measuring product quality would analyze product stream samples and provide information in a repeatable manner providing measurements of product quality on a timely basis. In some implementations, the system may include a mass spectrometer that includes a fragmentation component for fragmenting ions of a sampled analyte and operative to detect and analyse such fragment ions.

Referring to FIG. 2A and FIG. 2B, the fragmentation component is identified as an electron-capture dissociation (ECD) device. This fragmentation component is not limited to ECD, but may comprise an alternate fragmentation component such as an electron-transfer dissociation (ETD) device, UV/IR device, a blackbody infrared dissociation (BIRD) device, or other known MS fragmentation device operative to produce fragmentation patterns from input ions. The use of fragmentation component allows for a single measure of the pharmaceutical agent which produces fragmentation patterns which can be interpreted to provide information on the primary sequence. Such fragmentation methods have been shown prior to generate sufficient information to be able to identify the molecule of interest as well as determine if the molecule has been altered.

In some embodiments, the system may be operative to pretreat the sample before fragmentation by the fragmenting component to provide highly reproducible large fragments which can be analyzed (for instance by ECD or ETD). In some aspects, the pretreatment may comprise immunoglobulin cleavage, for instance, using IdeS. In some aspects, the pretreatment may comprise online reduction. In some aspects, the pretreatment may comprise a combination of immunoglobulin cleavage and online reduction.

In some embodiments, the system as shown in FIG. 2B could be used for the implementation of such methods allowing for direct fragmentation analysis of the larger fragment units.

Figure 3:
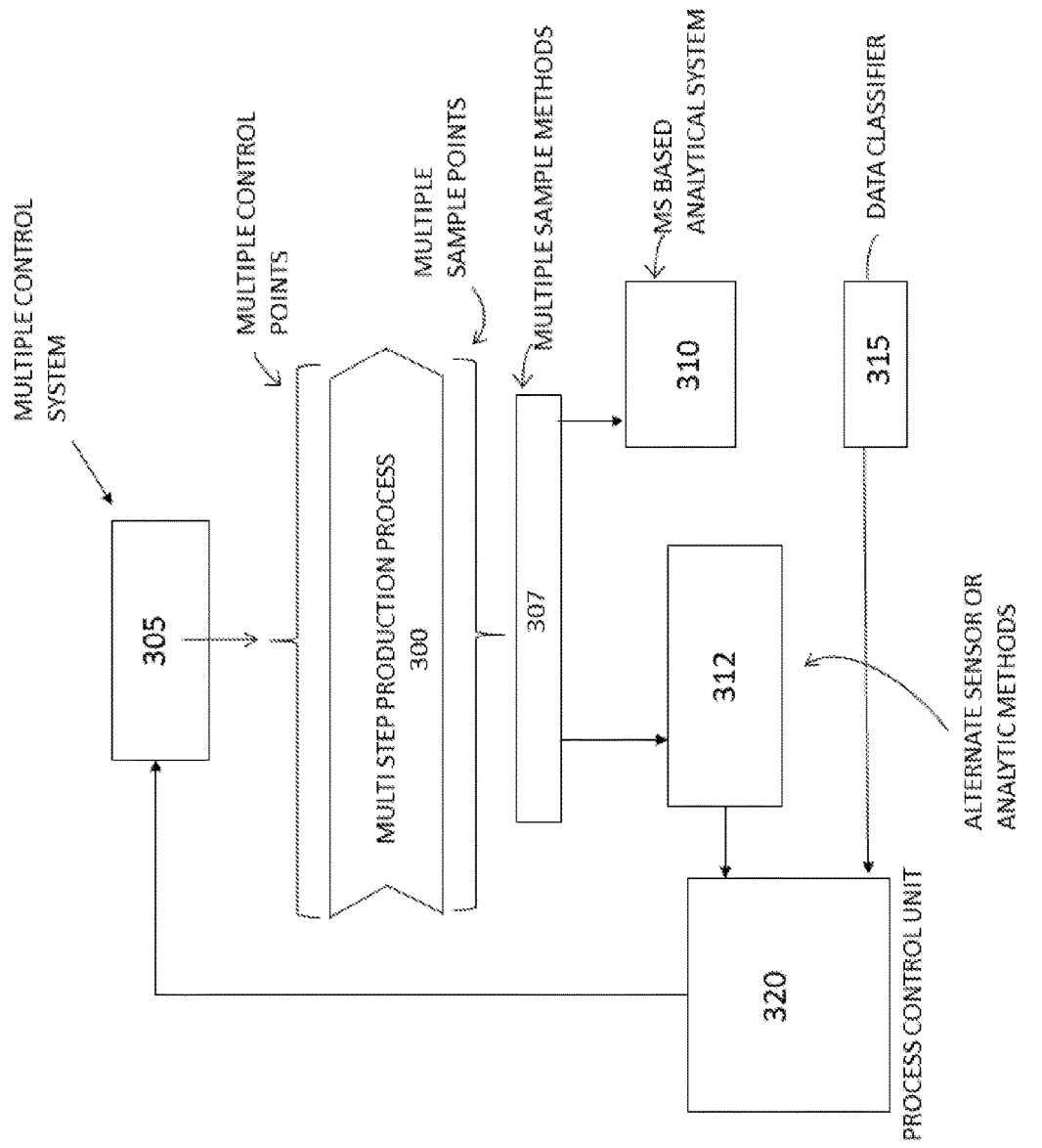
FIG. 3 is a process flow diagram of a method for process analysis.

Referring to FIG. 3, in some embodiments a system is provided which allows for automated and objective data processing of the analysis results to produce an actionable measure of product quality. The system is operative around a production process, such as the multi-step production process 300 illustrated in FIG. 3. The production process 300 managed by one or more control components 305 under the control of a process control unit 320.

The system may include a sampling component 307 for obtaining sample from the production process 300. In some aspects, the sampling component may be operative to sample continuously from the production process 300. In some aspects, the sampling component may be operative to sequentially obtain discrete samples either at a regular sampling rate, at discrete sampling periods, or a combination of regular sampling and discrete sampling as may be applicable for the production process 300. The sampling component 307 delivering sample to an MS-based analytical system ("MS system") 310. In some aspects, the sampling component 307 may also deliver sample to an alternate analytical sensing component 312 such as a sensor or other analytical device.

The MS system 310 operative to mass analyze the sample to produce mass analysis data for input to a data classifier 315. The data classifier 315 operative to classify the mass analysis data to produce an actionable measure of product quality from the sample to provide a product quality control input to the process control unit 320 operative to control the production process 300.

Samples may be pretreated as described above and presented to the MS system 310 for analysis. In some aspects, the analysis may include fragmentation of sample fragments. The analysis data is passed to the classifier 315 which would provide a confidence of the form of the protein i.e. native or modified. This result could then be passed to the process control unit 320, and optionally combined with sensor read backs from the sensing component 312, to guide control of the control components 305.

As distinct from existing methods of analysis, the present system and methods provides for a quality evaluation of a presented sample that determines whether components in the sample match an expected collection of components for that sample. For a bioprocess, for instance, the components are changing as the bioprocess evolves. At any given sampling period a different collection and/or ratio components may be present in the sample. The MS system 310 may be operative to generate mass spectra of ionized sample components and/or mass spectra of fragmented ionized sample components and to evaluated the generated mass spectra against classification metrics to produce a product quality score for that sampling period.

The model providing an abstraction to identify patterns in the MS spectra indicative of an expected product or products present in the sample at a particular sampling period. As the process evolves, the constituent products and their respective ratios may change, leading to changes in the MS spectra. By abstracting to a classification model a tolerance for variations in products may be built in to the analysis. Furthermore, multiple products may in some cases be accommodated without formal separation, for instance using an LC, prior to analysis.

In some aspects, the product quality score may indicate the presence/absence of expected bioprocess products for that sampling period. In some aspects, the product quality score may indicate the presence/absence of undesirable bioprocess products that may indicate a deviation in the expected bioprocess reaction at that sampling period.

Figure 4:
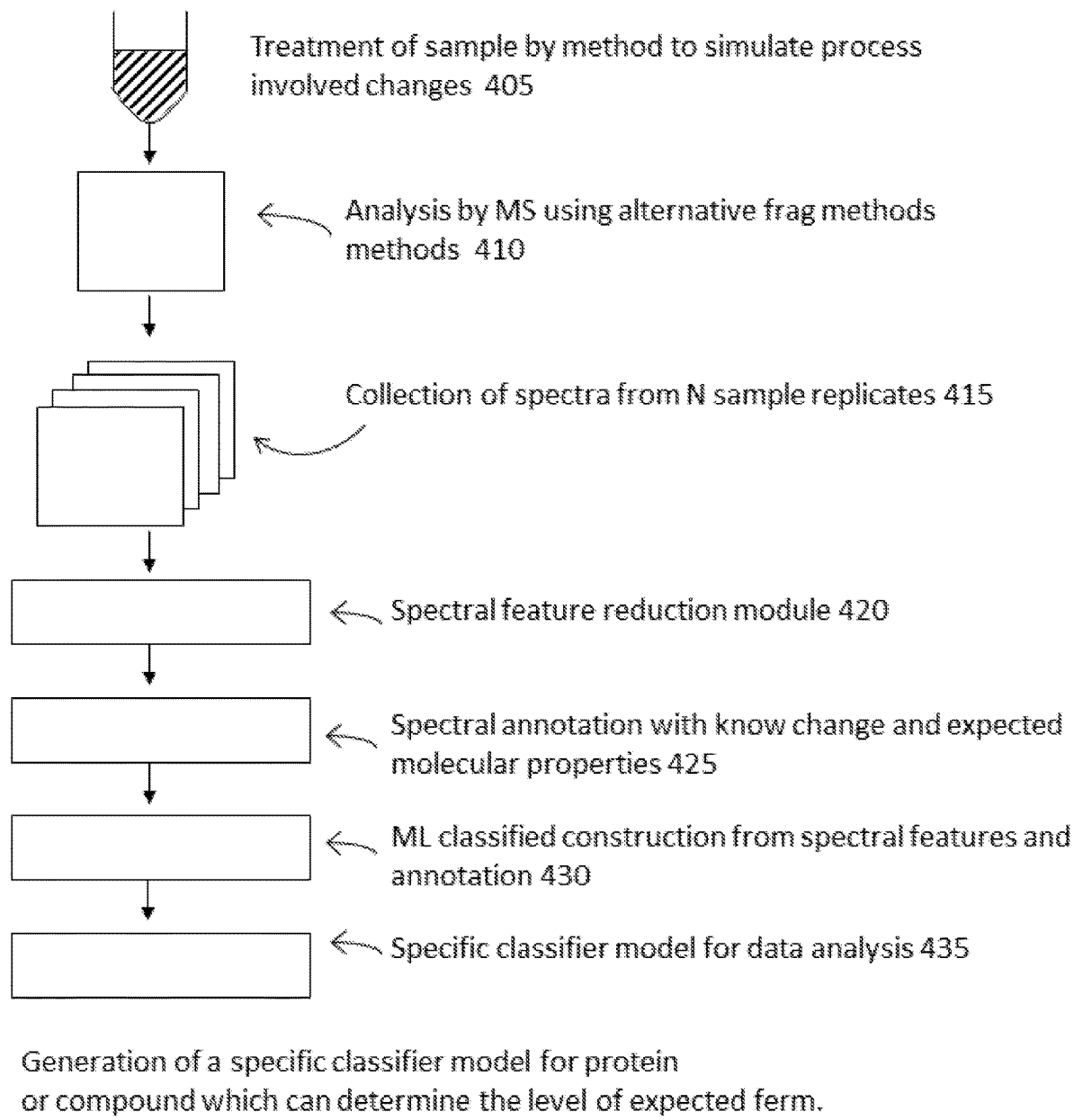
FIG. 4 is a process flow diagram of a method for generating a classifier representative of a process.

Referring to FIG. 4, a classifier model may be generated to enable classification of output analysis data to correspond to a determined product quality metric. Once the classifier model has been generated the trained model may be implemented in a real time system for the analysis of product quality based on samples obtained from the production process 300. In operation the trained model is applied by the classifier 315 to providing the actionable measure of product quality to the process control unit 320. In some aspects, for instance, the actionable measure of product quality may comprise a confidence of the form of a protein in the sample i.e. native or modified.

To generate sufficient analysis data for the model to be effective it may be required to analyze many forms of molecules with the system. These many forms of molecule may be generated in vitro through the addition of chemical agents which alter the primary structure of higher order structure.

Repeated analysis of these altered forms a multitude of times by the system provides analysis data which can then be grouped and passed through a spectral feature reduction unit where data can be pretreated by techniques such as smoothing, binning, centroiding or combinations of these methods. The output of a preprocessing unit is combined with other metadata related to the process treatment and modifications which are known to the active component. This data is then passed to a machine learning classifier operative to extract the critical features from the input data and to generate a classification model.

The system operative to analyze different forms of the molecules and to apply the classification model to future sets of analysis data corresponding to the analyzed different forms of molecules to classify the different forms of molecules from the analysis data. The machine learning classifier may comprise known classifiers that may be applied to the analysis data. In some embodiments multiple levels of classifier or prediction algorithms may be employed to generate a robust system.

In general, a bioprocess reaction may be executed and expected bioprocess products may be sampled for each sampling period. Success of the bioprocess reaction may confirmed with detailed offline testing, and the samples used as inputs to build the classification model for that bioprocess. In some aspects, known deviant reaction products may be classified to enable the model to positively identify when a bioprocess reaction is deviating from its expected reaction path through detection of deviant bioprocess products. Whether bioprocess products, deviant products, or a combination are classified, the resultant classification model may be used to evaluate samples collected from a bioprocess to confirm that each sample matches an expected product profile for that sampling period.

Fragmentation may be used to generate more robust analysis data indicative of the components of a sample. Accordingly, the classifier model may be trained based on detection of both parent ions and/or daughter ions produced from a sample.

In all cases the development of the specific system is predicated by a need to have a robust data processing system. The invention describe below provides a method for both the development of as well as implementation of a data processing system which would allow for the automated processing of the data. FIG. 4 provides an outline of the system.

Referring to FIG. 4, an example of a method for generating a model is presented. In step 405 samples would be pretreated as described above to simulate process-involved changes and the pretreated samples are presented to a mass spectrometer. As indicated above, the pretreatment may comprise, for instance, dilution, separation, and or other means. In step 410 the MS system analyzes the samples, for instance including fragmentation of the fragments, to produce analysis data. Step 405 may be repeated N times for N sample replicates for each sampling period. In step 415 a collection of N mass spectra are produced by mass analysis of a plurality of N sample replicates for each sampling period. In step 420 a spectral feature reduction process may be performed on the collection of N spectra to obtain a reduced spectral feature. In step 425 one or more spectral annotations with known changes and expected molecule properties may be generated. In step 430, a machine learning classifier may be constructed from the reduced spectral feature and the spectral annotation(s). In step 435 a specific classifier model may be generated for subsequent process monitoring when evaluating a corresponding sampling period from a subsequent process.

In an embodiment where the production process 300 comprises a fermentation process, for instance, the trained classifier model for a protein or compound may be used to determine a stage of the fermentation process, for instance to indicate level of expected fermentation of feedstock to the production process 300.

To generate sufficient data for the model to be effective it will require the analysis of many forms of molecule through the system. These many forms of molecule are generated in vitro through the addition of chemical agents which alter the primary structure of higher order structure. Analysis of these altered forms a multitude of times through the system provides data which can then be grouped and passed through a spectral feature reduction unit where data can be pretreated by techniques such as smoothing, binning, centroiding or combinations of these methods. The output of the preprocessing unit is combined with other meta data related to the process treatment and modifications which are known to the active component. This data is then passed to a machine learning classifier which is able to extract the critical features from the input data and generate a model to be able to classify the different forms. The machine learning classifier could take on any form of classifier and it may be prudent to also utilize multiple levels of classifier or prediction algorithms to generate a robust system.

Once the model is trained this can be implemented in a real time system for the analysis of product providing a confidence of the level of the product quality which can be fed directly into a process control system for corrective action if required.

I claim:

1. A method for confirming product quality of a process: collecting one or more samples from a process; generating, for each of the one or more samples, a mass spectra using a mass spectrometer; comparing each generated mass spectra with a model representative of at least one expected product to generate a product quality metric for that corresponding sample, wherein the model includes separate classifiers for mass spectra generated from parent ions of the sample and daughter ions fragmented from the parent ions.

2. The method of claim 1, wherein the one or more samples comprise a series of samples collected from different sampling periods of the process.

3. The method of claim 1, further comprising: evaluating the product quality metric for each sample and directing a process control system to take corrective action on the process based on the evaluated product quality metric.

4. The method of claim 1, wherein the at least one expected product comprises at least one reaction product expected for a sampling period corresponding to that sample.

5. The method of claim 1, wherein the at least one expected product comprises at least one deviant product indicative of a deviation from the process for a sampling period corresponding to that sample.

6. The method of claim 1, wherein at least one of the mass spectra are generated from daughter ions fragmented from a parent ion of the sample.

7. The method of claim 1, wherein the model comprises a separate model for each sampling period of the process, and wherein the separate models are representative of products produced at each of the corresponding sampling periods.

8. A method for confirming product quality of a process: collecting one or more samples from a process; generating, for each of the one or more samples, a mass spectra using a mass spectrometer; comparing each generated mass spectra with a model representative of at least one expected product to generate a product quality metric for that corresponding sample, wherein the model is generated by: executing, one or more times, a production process; sampling the production process at a plurality of sampling periods; analyzing each of the samples to produce a mass spectra; and, training a data classifier based on the mass spectra to generate the model.

9. The method of claim 8, wherein the production process may be confirmed by secondary analysis to confirm the samples are representative of the expected products.

10. A system for confirming product quality of a process, comprising: a sample separation/delivery component for delivering sample; an ion source for receiving delivered sample; a mass spectrometer having a hardware processor for generating mass spectra representative of the delivered sample; and, a hardware controller operative to compare a model to the mass spectra and to generate a product quality metric based on the comparison, wherein the model includes separate classifiers for mass spectra generated from parent ions of the sample and daughter ions fragmented from the parent ions.

11. The system of claim 10, further comprising: directing a corrective action to the process based on the product quality metric.

12. A system for confirming product quality of a process, comprising: a sample separation/delivery component for delivering sample; an ion source for receiving delivered sample; a mass spectrometer having a hardware processor for generating mass spectra representative of the delivered sample; and, a hardware controller operative to compare a model to the mass spectra and to generate a product quality metric based on the comparison, wherein the model is generated by:
  executing, one or more times, a production process; sampling the production process at a plurality of sampling periods; analyzing each of the samples to produce a mass spectra; and, training a data classifier based on the mass spectra to generate the model.

13. The system of claim 12, further comprising: directing a corrective action to the process based on the product quality metric.

* * * * *